Oct. 19, 1965

A. B. ECKERT, JR 3,213,420

MISSING CHARACTER DETECTION

Filed Dec. 29, 1960

INVENTOR.
ALTON B. ECKERT JR.
BY
ATTORNEYS

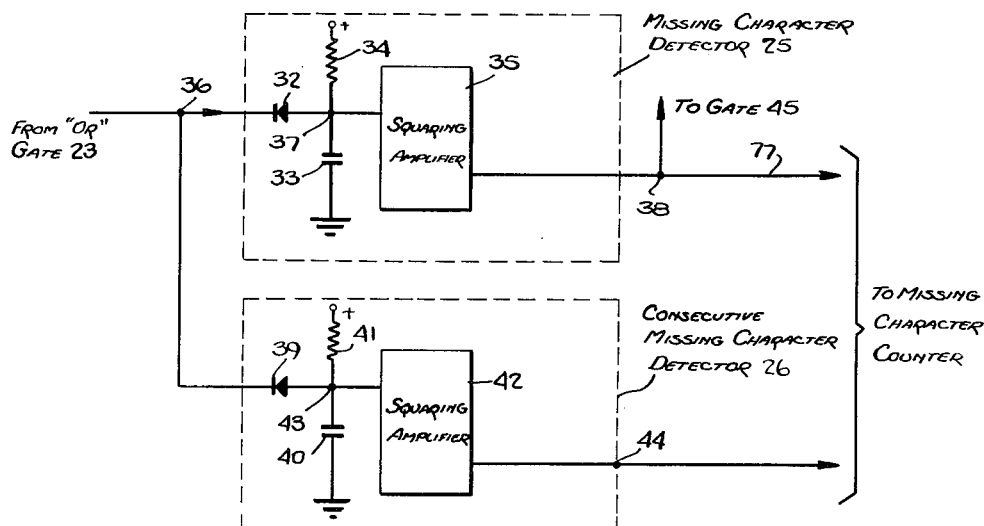
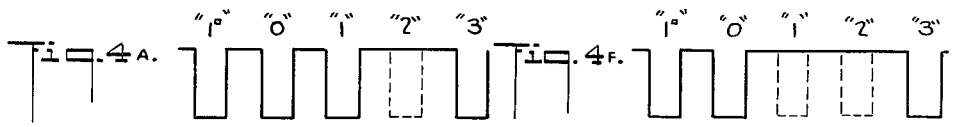
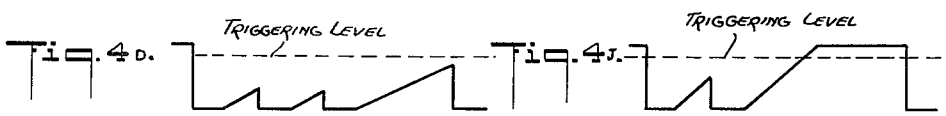
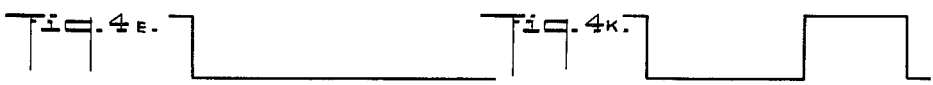

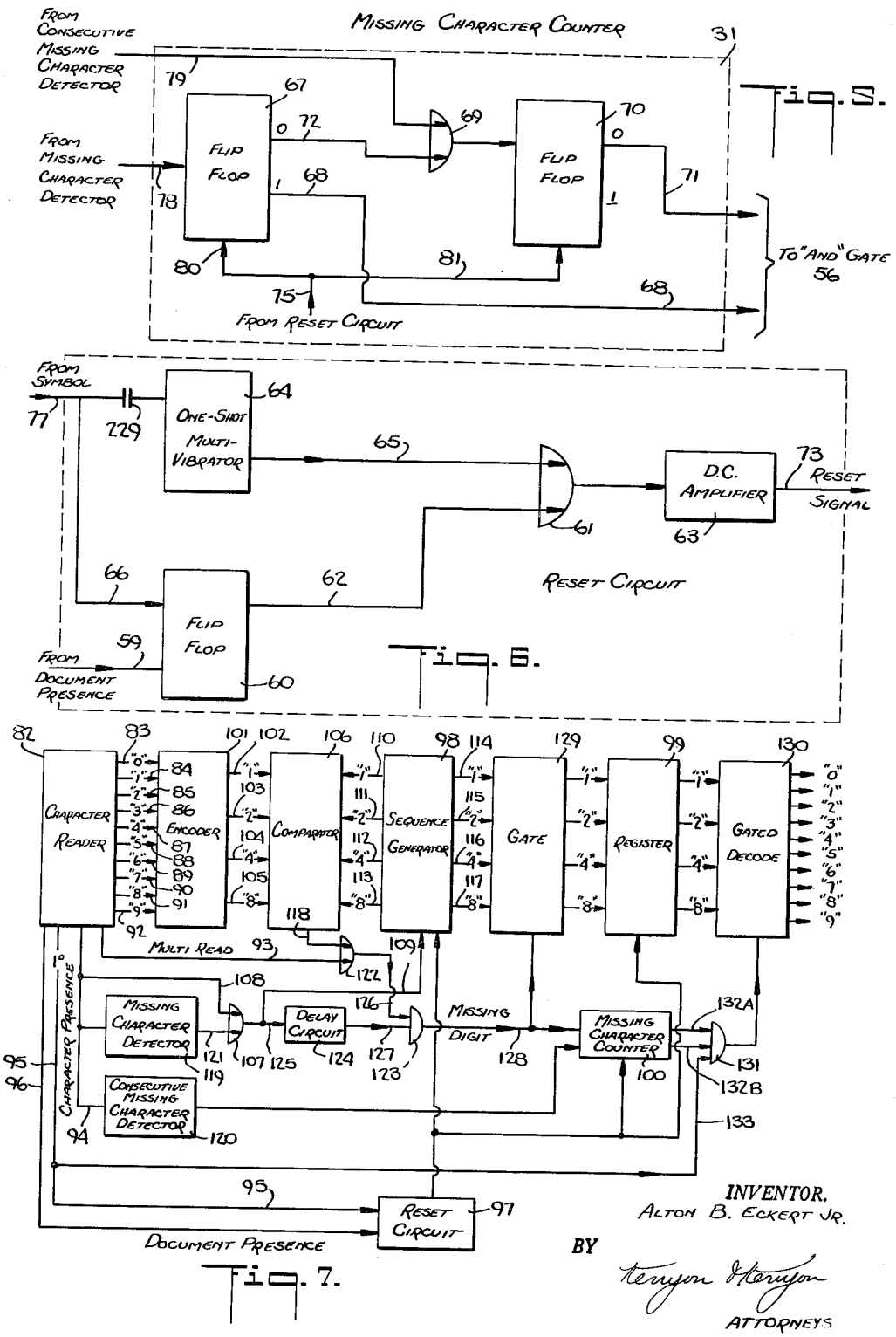

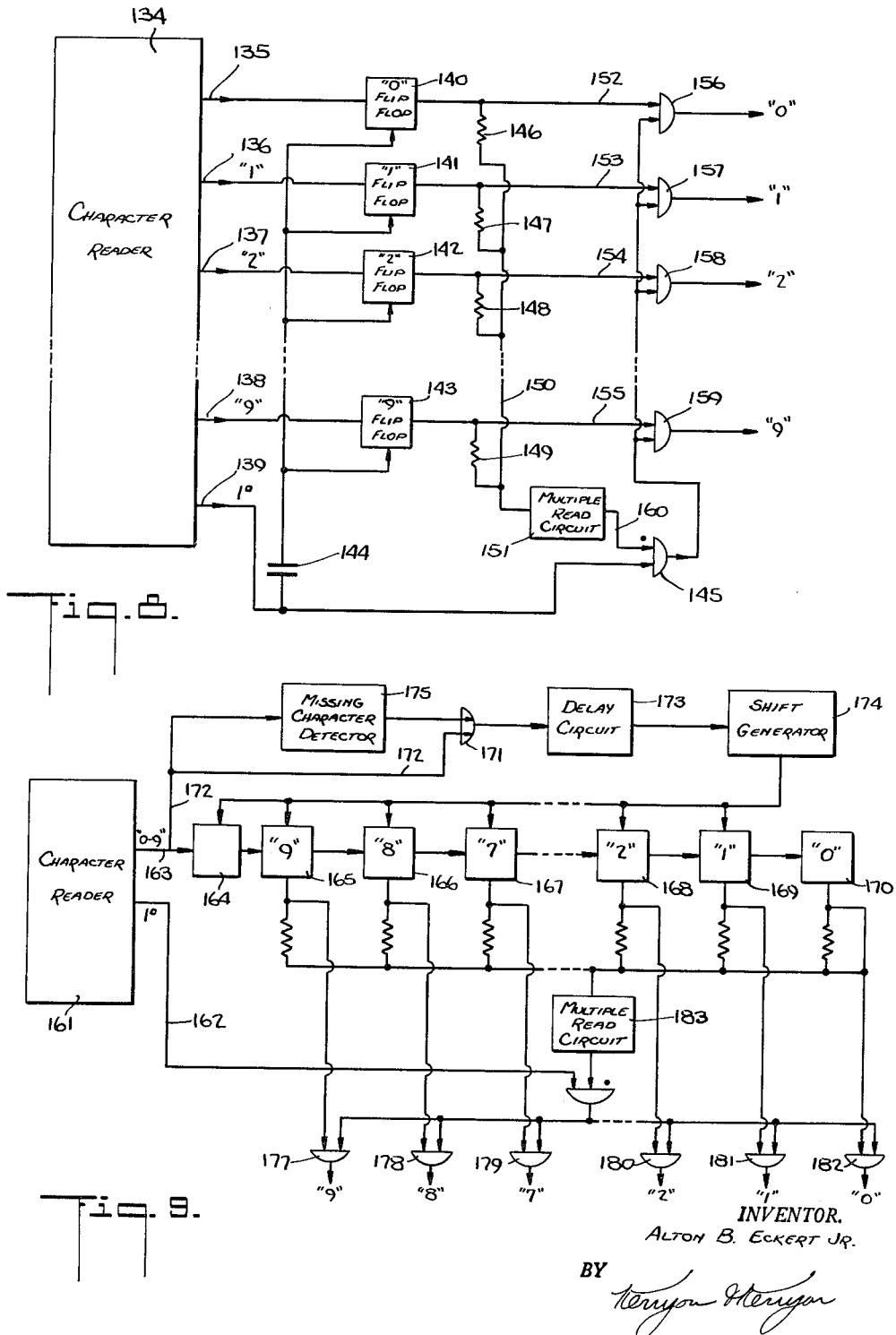

Oct. 19, 1965     A. B. ECKERT, JR     3,213,420

MISSING CHARACTER DETECTION

Filed Dec. 29, 1960     6 Sheets-Sheet 6

INVENTOR.
ALTON B. ECKERT JR.
BY
Kenyon & Kenyon
ATTORNEYS

United States Patent Office 3,213,420
Patented Oct. 19, 1965

3,213,420
MISSING CHARACTER DETECTION
Alton B. Eckert, Jr., 17 Jennifer Lane, Port Chester, N.Y.
Filed Dec. 29, 1960, Ser. No. 79,232
18 Claims. (Cl. 340—146.3)

This invention relates to methods for coding documents and also relates to devices for reading the code and converting it to useful intelligence.

In the field of document handling and sorting, there is increased reliance on automatic means which are responsive to code designations printed on the documents. An example of such automatic means is the character reader described in copending application, Serial No. 20,948 filed April 8, 1960, by Alton B. Eckert, Jr.

The character reader of the aforementioned copending application is employed to read magnetically active characters which are printed on a document. The application describes in detail the manner in which the scanning of the coded document results in recognition of the character being scanned. The information thus obtained from a document may be transmitted to a handling or sorting device employed in conjunction with the reader to enable the document to be handled appropriately.

There are many instances in which coded information cannot be placed on the document until it is placed in use. An example of such a situation would be a credit card or charge account system in which a document is to be coded with the amount of the individual purchase. Obviously, the coding can be done only at or after the time the purchase was made.

Accordingly, it is an object of this invention to provide a method for post-coding documents and subsequently identifying such post-coded documents by means responsive to the coded designation appearing thereon.

It is a further object of this invention to provide a method for post-coding a document and also to provide code analyzing devices suitable for analyzing such documents to determine the coded designation.

A primary consideration in any system of post-coding relates to the actual method by which the coded designation is introduced onto the document. One of the more obvious ways of accomplishing this would be to print a set of characters onto a document, for example, representing the purchase price of a credit card sale. In this system, post-coding would be identical to pre-coding except that the coded designation would be printed on the document at a time subsequent to the fabrication thereof. All of the other elements of pre-coding would be identical, the same character reader being suitable for use in reading the precoded and the post-coded designations. However, a very important practical disadvantage to this method is that machines for printing characters with the accuracy necessary for automatic recognition and handling would represent a very large expenditure. Accordingly, one desiring to post-code in this manner would have to purchase a printing device or machine which is almost equivalent to that used by commercial printers.

Accordingly, it is an object of this invention to provide a method for post-coding documents which is simple, accurate and economical.

In accordance with the present invention, a series of characters are printed on the document at the same time as the pre-coded characters. Post-coding is accomplished by obliterating or defacing at least one of the series of characters of the group. Such a method of post-coding requires the use of a code analyzer which is capable of scanning the post-coded series of characters to determine which of the series has been obliterated or defaced.

Accordingly, it is an object of this invention to provide a code analyzer which is capable of analyzing a series of post-coded characters to determine which of the series has been defaced.

In many instances, it will be desirable to have pre-coded and post-coded information on the same document.

It is accordingly another object of this invention to provide a compatible code analyzer for recognizing both pre-coded and post-coded information appearing on the same document.

Briefly stated, the present invention represents an entirely new concept in the coding of documents and subsequent analysis thereof. The present invention involves a method of post-coding which includes the step of obliterating at least one character from a group of characters present on the document. Such obliteration may be accomplished simply and inexpensively by means of a conventional hand ticket punch. Provided for use in conjunction with this method of post-coding, is a code analyzer which analyzes the group of characters to determine which of them has been defaced or obliterated.

In general, the code analyzer of this invention utilizes a character reading means which produces a response only when a character is recognized. Among others, the character reader described in detail in the aforementioned Eckert application may suitably be employed as the character reading means of this invention.

The code analyzer of this invention also comprises logic means which is responsive to the output produced by the character reading means. This logic means furnishes output signals which are representative of the particular character which has been obliterated from a series of characters. Several novel circuit configurations are described in detail below.

By choosing characters for the post-coded group which have distinguishing characteristics identical with one or more of the characters in the pre-coded group, the same character reading means may be used for pre-coding and post-coding analysis.

The invention will be more readily understood, by reference to the drawings in which:

FIG. 3 is a detailed schematic diagram of two elements of the device of FIG. 1;

FIGS. 4A through 4K are wave forms depicting the operation of the elements shown in FIG. 3;

FIG. 5 is a detailed schematic drawing of an element of the device of FIG. 1;

FIG. 6 is a detailed schematic drawing of an element of the device of FIG. 1;

FIG. 7 is a schematic drawing of a second device in accordance with this invention suitable for use in reading pre-coded and post-coded characters;

FIG. 8 is a schematic drawing of a third device in accordance with this invention suitable for use in reading pre-coded and post-coded characters;

FIG. 9 is a schematic drawing of a fourth device in accordance with this invention suitable for use in reading pre-coded and post-coded characters;

Figure 1:
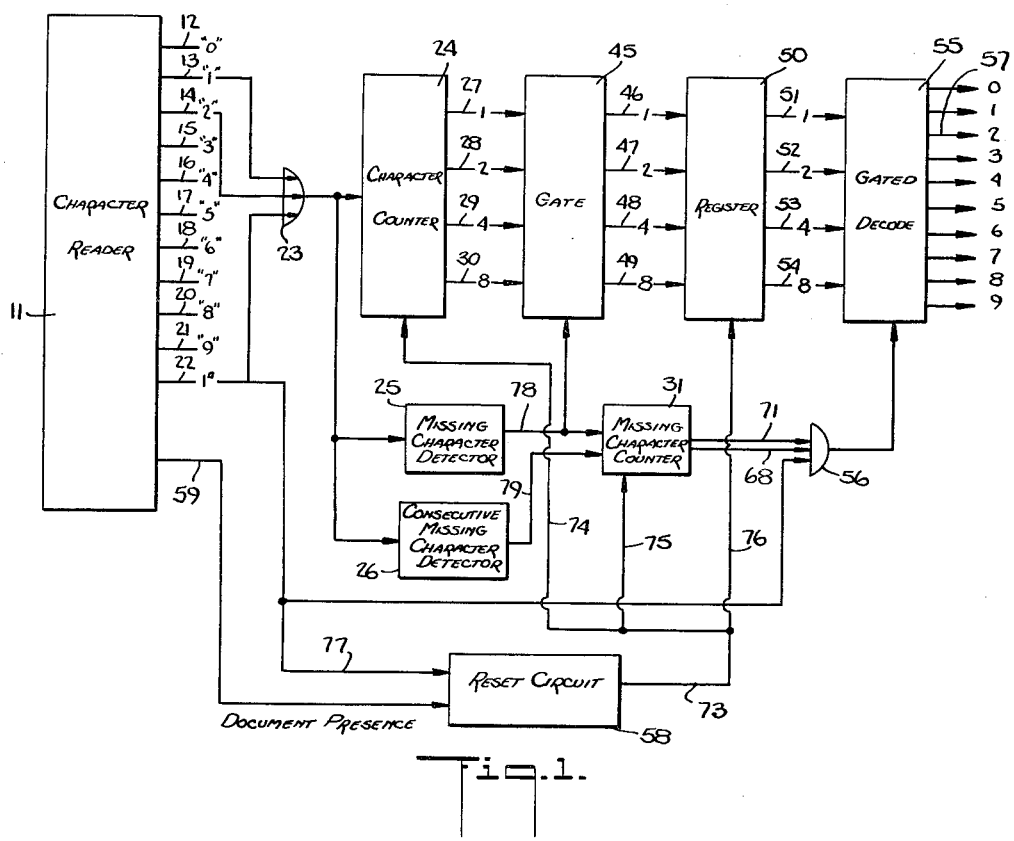
FIG. 1 is a schematic drawing of one embodiment in accordance with the present invention suitable for analyzing pre-coded and post-coded characters.

With reference now to the drawings and more particularly to FIG. 1, there is depicted a compatible code analyzer suitable for use in analyzing both post-coded and pre-coded characters.

Figure 2:
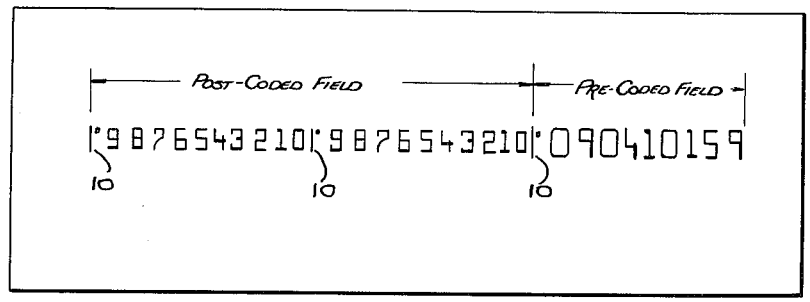
FIG. 2 is a schematic drawing of a document containing pre-coded and post-coded characters.

FIGURE 2 depicts a document containing both post-coded and pre-coded groups of characters. This document is normally scanned from right to left. As shown, there are two groups of characters in the post-coded field, separated by a symbol 10. The symbol 10 is also employed at the end of the post-coded field and between the pre-coded field and the post-coded field.

FIG. 1 depicts character reader 11 which is conveniently of the type described in copending application, Serial No. 20,948, or similar types using a single dimension scan. It is to be appreciated that, although the invention is described herein in terms of magnetically active characters which require the use of a magnetic character reader, the post-coded characters may be printed in a contrasting ink thereby permitting the use of optical readers, for example.

As depicted in FIG. 1, character reader 11 has eleven output leads designated by reference numerals 12 through 22. Ten of these leads represent the series of characters used in conjunction with pre-coded character recognition as described in the aforementioned co-pending application. The eleventh lead, lead 22, is employed for symbol 10.

Only three of the eleven output leads are employed to analyze intelligence derived from the post-coded field.

Lead 13 provides an output pulse when the character "1" in the post-coded field is recognized by character reader 11.

Lead 14 conveys pulses representative of a recognition of characters "0" and "2" through "9." This is due to the fact that each of characters "0" and "2" through "9" of the post-coded field, as shown in FIG. 2, exhibit substantially identical wave forms when scanned in one dimension by character reader 11.

In order to provide a font of characters which exhibit substantially identical wave forms when scanned, each of the characters must be designed to provide the same area density of magnetically active material. That is to say, each character when scanned must exhibit to the scanning head the same time rate of change of magnetically active material. Thus, for example, in scanning a magnetically active character from left to right, it is the density of magnetically active material which appears in an infinitesimally thick vertical section of the character which determines the magnitude of the wave form at that particular point. The scanning head in moving from left to right across the magnetically active character is thus responsive to the proportion of the height of the scanned area which is covered with magnetically active material. It makes no difference to the scanning head whether the magnetically active material is located in the vicinity of the lower portion of the character or in the vicinity of the upper portion of the character since it is the ratio of magnetically active area to non-magnetically active area in the aforementioned infinitesimally thick section which determines the magnitude of the wave form. Accordingly, a font of characters may be designed which may be distinguished as different numbers, but, which to the scanning head moving across the character appear identical.

Thus, for example, assuming that the post-coded and pre-coded fields are printed in a magnetically active substance, the magnetic reading head employed in character reader 11 provides essentially the same electrical wave form in response to the scanning of each of characters "0" and "2" through "9." Having the same wave form, it follows that, to character reader 11, each of the characters "0" and "2" through "9" are indistinguishable one from the other. Since in the font of characters used in this embodiment, each of characters "0" and "2" through "9" have been designed to provide a wave form which is substantially identical to that of the character "2" of the pre-coded field, each of these characters will be recognized by character reader 11 as character "2" and, therefore, will provide an output pulse at lead 14.

A separate channel is employed for the character "1" because conformation of its wave form to that of character "2" would necessitate a sacrifice in its visual appearance.

The feature relating to the use of a font of characters in which all of the characters have the identical wave form or at least have $(n-1)$ wave forms where $n$ represents the total number of characters, is advantageous in several respects. First, in a situation in which the device of FIG. 1 is to be used only in conjunction with post-coded character identification, character reader 11 is enormously simplified by the elimination of all of the circuit components involved with recognition of characters "0" and "3" through "9." Clearly, this reduces the cost of the character reader significantly.

A second advantage relates to the improved accuracy which results from the use of a font in which at least two of the characters have the same wave form. In the character reader described in the aforementioned Eckert application, there is a danger that a partially obliterated character will be recognized as a different member of the group of characters. That is to say, a partially obliterated "3" may, when scanned, exhibit the same wave form as character "5." This could prevent the device from making a proper determination of the partially obliterated character.

On the other hand, if all or substantially all of the characters have the same wave form, even a partial obliteration will serve to distort the character so that it will not be recognized.

As shown in FIG. 1, output leads 13, 14 and 22 are connected to OR gate 23. The output of OR gate 23 is connected to character counter 24, missing character detector 25, and consecutive missing character detector 26.

For purposes of explanation, it is assumed that the character "2" has been obliterated from the first group of characters in the post-coded field. As the character "0" passes under the read head of the character reader, a pulse appears at output lead 14 of character reader 11. This pulse is transmitted through OR gate 23 to character counter 24.

Character counter 24 may be any type of counter. In the embodiment shown in FIG. 1, character counter 24 is a conventional four-stage binary counter with the 1, 2, 4 and 8 output leads being utilized. (See Pulse and Digital Circuits, Millman & Taub, McGraw-Hill Book Publishing Company, 1956, pages 323, et seq.) These leads are identified by reference numerals 27 to 30 in FIG. 1.

When the pulse representing character "0" is transmitted through OR gate 23 to character counter 24, the first binary unit is switched from the "0" to the "1" state, thereby providing a continuous signal at output lead 27 only, signifying that one character has been recognized.

When the character "1" passes under the read head of character reader 11, a pulse appears at output lead 13. This pulse is also transmitted through OR gate 23 to character counter 24. In accordance with the well known operation of character counter 24, the continuous signal at lead 27 is removed in favor of a continuous signal appearing at lead 28 only, signifying that two characters have been identified. In other words, reference to the output leads 27 through 30 of character counter 24 will permit determination of the position within the post-coded field of the next character in line to be identified by the character reader 11.

As stated above, it is assumed for the purposes of this example that the character "2" has been obliterated from the first post-coded group of characters in the post-coded field of characters shown in FIG. 2. Accordingly, the wave form, if any, produced by obliterated character "2" will not conform and, therefore, no output will appear at lead 14 of character reader 11. Therefore, the condition of character counter 24 will be unchanged.

After obliterated character "2" has been scanned by character reader 11, character counter 24 would still be characterized by a signal appearing at output lead 28 only, denoting that two characters have previously been recognized and counted.

At this point, it may be helpful to discuss the operation of missing character detector 25, missing character counter 31, and consecutive missing character detector 26.

As shown in FIG. 1, missing character detector 25 is connected to OR gate 23. Thus, each pulse which passes through OR gate 23 is introduced into missing character detector 25. As shown in FIG. 3, missing character detector 25 includes diode 32, a network consisting of capacitor 33 and resistor 34 which is connected to a positive D.C. voltage source (not shown) which is more positive than the maximum voltage at point 36. The squaring amplifier 35 may, for example, be the well known Schmidt trigger. (See Pulse and Digital Circuits, Millman and Taub, McGraw-Hill Book Publishing Company, 1956, pages 164 to 172.)

The wave forms shown in FIGS. 4A through 4K are useful to explain the operation of missing character detector 25. The voltage wave form at point 36 in FIG. 3 is shown in FIG. 4A. Prior to receipt of any pulses from OR gate 23, the voltage is at a certain positive level. The recognition by character reader 11 of the symbol 10 which precedes the post-coded field produces a negative-going square wave pulse as shown in FIG. 4A.

FIG. 4B depicts the voltage wave form at point 37, the junction of capacitor 33 and resistor 34. Prior to the receipt of a pulse from OR gate 23, the voltage at point 37 is at the same level as point 36. Accordingly, capacitor 33 is charged to this voltage.

Upon receipt of a negative-going pulse at point 36, the conduction of diode 32 lowers the potential level of point 37 and capacitor 33 discharges at a very high rate, producing the wave form depicted in FIG. 4B. Point 37 remains at the low potential level for the duration of the negative-going pulse produced by the recognition of symbol 10.

At the termination of the negative-going pulse produced by symbol 10, as shown in FIG. 4A, diode 32 is reverse-biased and, therefore, capacitor 33 commences to regain its charge by current flowing through resistor 34. The length of time required for capacitor 33 to charge completely is determined by the RC product of capacitor 33 and resistor 34. Thus, as shown in FIG. 4B, in the interval of time between the pulses produced by recognition of symbol 10 and character "0," the capacitor is tending toward its maximum charge. However, the capacitor is prevented from regaining its maximum charge because the RC time constant is greater than the interval of time between these pulses. In other words, before capacitor 33 can regain its full charge, a pulse representing recognition of character "0" appears at point 36, thereby once again discharging capacitor 33.

When obliterated character "2" is scanned by character reader 11, no negative-going square wave pulse is received at point 36. The pulse which would normally have been received is shown in dotted outline form in FIG. 4A.

With reference now to FIG. 4B, the absence of a negative-going pulse for obliterated character "2" permits capacitor 33 to regain its maximum charge.

The dotted line in FIG. 4B represents the level of voltage necessary to trigger squaring amplifier 35. As shown in FIG. 4B, as long as consecutive negative-going pulses are received at point 36, capacitor 33 is prevented from assuming a charge sufficient to trigger squaring amplifier 35. However, when obliterated character "2" fails to produce a negative-going pulse, capacitor 33 charges to a potential sufficient to trigger squaring amplifier 35.

The voltage at point 38, representing the output of squaring amplifier 35, is shown in FIG. 4C. Prior to the receipt of any negative-going signals, the squaring amplifier is in the "on" condition since the quiescent voltage level at point 37 is in excess of the triggering level.

As the first negative-going pulse is produced, the voltage across capacitor 33 is decreased to a level which causes squaring amplifier to go into the "off" condition. The absence of a proper sequence of negative-going pulses at point 36, caused, for example, by the obliteration of charatcer "2" permits capacitor 33 to charge above the triggering level thereby producing a positive-going pulse at point 38.

Upon receipt of a subsequent negative-going pulse at point 36, capacitor 33 is discharged, and in turn causes squaring amplifier 35 to go into the "off" condition. Accordingly, as shown in FIG. 4C, the receipt of a negative-going pulse for character "3" as shown in FIG. 4A, decreases the charge on capacitor 33 as shown in FIG. 4B, and in turn squaring amplifier 35 is placed in the "off" condition as shown in FIG. 4C.

Thus, squaring amplifier 35 produces a signal indicative of a missing character when it goes from the "off" condition to the "on" condition. In its normal operating state, squaring amplifier 35 is in the "on" condition. Accordingly, before squaring amplifier can function as intended, it must be placed in the "off" condition. This is accomplished by the symbols 10 which precede the characters "0" in the groups of the post-coded field. By connecting output lead 22 to OR gate 23, the pulse transmitted due to recognition of symbol 10 turns squaring amplifier 35 "off" and thus places missing character detector 25 in condition to detect a missing or obliterated charatcer "0" or subsequent character. If the circuits were not so connected, missing character detector 25 could not recognize that a character "0" had been obliterated, since the absence of a pulse would have no effect on squaring amplifier 35.

Consecutive missing character detector 26 is also shown in detail in FIG. 3. Consecutive missing character detector 26 operates on the same basic principle as missing character detector 25. Thus, as shown in FIG. 3, consecutive missing character detector 26 consists of diode 39, capacitor 40 and resistor 41. In consecutive missing character detector 26, the RC product of capacitor 40 and resistor 41 is greater than that of the corresponding elements in missing character detector 25. Accordingly, the charge time of capacitor 40 is increased over that of capacitor 33. The result is that the absence of only one pulse at point 36 is insufficient to trigger squaring amplifier 42. Thus, the absence of a pulse for character "2" in FIG. 4A does not permit capacitor 40 to charge to the triggering level of squaring amplifier 42, as shown in FIG. 4D. Accordingly, squaring amplifier 42 produces no output signal, as shown in FIG. 4E.

However, assume that character "1" is obliterated inadvertently in addition to character "2." With reference now to FIG. 4G, it is seen that prior to the pulse produced by symbol 10, capacitor 40 is fully charged so that the voltage at point 43 is above the triggering level of squaring amplifier 42. Upon receipt at point 36 of a pulse produced by recognition of symbol 10, the voltage at point 43 decreases as capacitor 40 discharges through diode 39. At the end of the negative-going pulse for symbol 10, capacitor 40 begins to charge. It is noted in FIG. 4G that the absence of a pulse for a single obliterated character, character "1" results in capacitor 40 charging insufficiently to cause the potential at point 43 to attain the triggering level of squaring amplifier 42. As stated above, this is due to the value of the RC constant for capacitor 40 and resistor 41.

Moving farther along the post-coded field, the obliteration of character "2" permits capacitor 40 to continue to charge to a more positive potential. It is seen in FIG. 4G that the absence of character "2" in addition to character "1," in other words, the presence of two consecutive missing characters, provides capacitor 40 with sufficient charging time so that point 43 attains a potential greater than the triggering level of squaring amplifier 42.

Thus, as shown in FIG. 4H, a positive-going pulse is produced at the output of squaring amplifier 42, to wit, at point 44.

FIGURES 4J and 4K depict the effect of consecutive missing characters on the potential level at points 37 and 38, respectively, of missing character detector 25. As shown, the net effect is to widen the output pulse produced by squaring amplifier 35.

With reference now to FIG. 1, the outputs of missing character detector 25 and consecutive missing character detector 26 are both fed to missing character counter 31. Briefly stated, missing character counter 31 prevents the device of FIG. 1 from producing an output unless at least one and not more than one missing character is detected. In other words, if no missing character is detected, or if two or more missing characters are detected, then missing character counter 31 acts to prevent the device of FIG. 1 from producing an output signal. The function of this circuit will be described in detail below.

The output of missing character detector 25 is also introduced to gate 45. Gate 45 is a parallel arrangement of four "and" gates, each of which is responsive to a different one of the four outputs of character counter 24 and each of which has a different output lead identified by reference numerals 46 through 49. In FIG. 1, each of the output leads 27 through 30 of character counter 24 is shown connected to gate 45.

Referring now to the situation in which obliterated character "2" passes under the read head of character reader 11, missing character detector 25 produces the pulse shown in FIG. 4C which is fed to gate 45. At this point, the reading of character "0" has caused character counter 24 to provide a continuous output signal in output lead 27, and the subsequent reading of character "1" has caused character counter 24 to provide a continuous output signal at lead 28, and to erase or terminate the signal at lead 27, denoting that two characters have been identified.

The absence of a pulse from OR gate 23 due to obliteration of character "2" causes missing character detector 25 to produce an output pulse which is fed to gate 45. Since there is a signal at output lead 28, the pulse from missing character detector 25 "ands" with this pulse to provide an output signal from gate 45 on lead 47.

As shown in FIG. 1, each of the outputs 46 through 49 of gate 45 is connected to register 50. Register 50 typically consists of four flip-flop circuits in parallel, one for each of the binary digits 1, 2, 4 and 8. These flip-flop circuits are arranged for unsymmetrical triggering (see Pulse and Digitals, Millman and Taub, McGraw-Hill Publishing Company, 1956, pages 140 to 144 and pages 156 to 161). Output leads 51 through 54 represent the aforementioned four flip-flops (see Pulse and Digitals, page 411, et seq.). The number "2" is stored in register 50 as a result of the coincidence of the missing digit pulse of missing character detector 25 and a signal on lead 28 of character counter 24. The number "2" is stored as a signal at output lead 52 of register 50.

As shown in FIG. 1, each of output leads 51 through 54 of register 50 is connected to gated decode 55. Gated decode 55 is a conventional binary-to-decimal conversion matrix which is designed to operate in response to a gating signal. Thus, gated decode 55 is designed to convert the binary number represented by the particular permutation of signals appearing at leads 51 through 54 of register 50, to its decimal equivalent, but it performs this function only upon receipt of a signal emanating from AND gate 56. AND gate 56 is responsive to missing character counter 31, and to the recognition of the symbol 10 which follows a group of post-coded characters. If one and only one missing character is identified, the appropriate signals are transmitted to AND gate 56 by missing character counter 31. Upon receipt of a pulse indicating identification of symbol 10, AND gate 56 transmits a signal to gated decode 55. Accordingly, at such time as a signal is fed from AND gate 56 to gated decode 55, the presence of a signal at output lead 52 of register 50 will be converted to a signal at output lead 57 of gated decode 55. The signal at output lead 57 represents the character "2" which had been obliterated from the document.

Reset circuit 58 is utilized primarily to clear character counter 24, register 50 and missing character counter 31 after each group of characters in the post-coded field is analyzed in the sense that each of the aforementioned circuits is placed in a condition which is responsive to a new set of intelligence. Reset circuit 58 is also employed in the compatible embodiment of FIG. 1 to preclude the storage of information during the time that the pre-coded field is being scanned by character reader 11. This last function is important since the characters "1" and "2" of the pre-coded field produce pulses which are introduced into OR gate 23 and which would, therefore, cause character counter 24 and associated circuitry to operate.

Chronologically, the first function of reset circuit 58 is to place character counter 24, register 50 and missing character counter 31 in a condition representative of the complete absence of information, and to hold these three circuits in such condition until it receives a signal resulting from the recognition of symbol 10 which follows the pre-coded field. As shown in FIG. 1, lead 59 connects character reader 11 to reset circuit 58. Lead 59 transmits a document presence signal to reset circuit 58, such signal resulting from the presence of a document in character reader 11, as more fully described in the aforementioned copending application, Serial No. 20,948.

With respect now to FIG. 6, which is a detailed schematic view of reset circuit 58, the document presence signal is transmitted to flip-flop 60 and places it in the "on" condition. Flip-flop 60 is connected to be responsive to unsymmetrical triggering.

When in the "on" condition, flip-flop 60 produces an output signal which is transmitted to OR gate 61 by lead 62. The output signal of flip-flop 60 is transmitted by OR gate 61 to D.C. amplifier 63, the output of this amplifier and output lead 73 representing the reset signal. Referring to FIG. 1, the reset signal is transmitted to character counter 24, missing character counter 31 and register 50 by leads 74, 75 and 76, respectively. The reset signal endures until flip-flop 60 is placed in "off" condition and thereby maintains character counter 24, register 50 and missing character counter 31, in a permanently reset condition which does not permit of the storage or transmission of any intelligence.

The termination of the reset signal occurs when the symbol 10 following the pre-coded field is recognized by character reader 11. When this symbol 10 passes under the read head of character reader 11, a pulse is produced at output lead 22. This output pulse is transmitted to reset circuit 58 through lead 77, as shown in FIG. 1.

As shown in FIG. 6, the pulse produced by the recognition of symbol 10 is transmitted to flip-flop 60 through lead 66. This pulse places flip-flop 60 in the "off" condition, since, as stated above, flip-flop 60 is responsive to unsymmetrical triggering. When flip-flop 60 is placed in the "off" condition, there is no output signal therefrom, and consequently, the reset signal produced by D.C. amplifier 62 is terminated.

Lead 77 is also connected to capacitor 229. The pulse produced by the recognition of symbol 10 is differentiated by capacitor 229. The trailing edge of the differentiated pulse triggers one shot multivibrator 64, which produces an output signal of limited duration. The output of multivibrator 64 is transmitted by lead 65 to OR gate 61 and thence to D.C. amplifier 63. Since one-shot multivibrator 64 was triggered by the trailing edge of the symbol 10 pulse, its output signal will produce a limited duration reset signal essentially simultaneously with the termination of the extended reset signal emanating from flip-flop 60.

The limited duration reset signal thus produced ensures that character counter 24 will be reset following the symbol 10 pulse which has caused counter 24 to advance to "1." If this was not done, the symbol pulse would be counted as "1" and the pulse from character reader 11 due to the recognition of character "0" would be counted as "2." Clearly, this is undesirable.

The pulses produced by character reader 11 due to recognition of each of the symbols 10 which follows a group of post-coded characters serve to clear and reset character counter 24, register 50 and missing character counter 31 by acting through one-shot multivibrator 64 as described above. Thus, the intelligence in these circuits from the previous group of post-coded characters is wiped out, and the circuits all placed in a condition responsive to new intelligence.

Since flip-flop 60 is triggered unsymmetrically, subsequent pulses through lead 66 have no effect. Flip-flop 60 can be placed in the "on" condition only by a document presence pulse at lead 59.

Thus, in summation, reset circuit 58 is energized by a document presence signal emanating from character reader 11. When so energized, reset circuit 58 maintains character counter 24, register 50 and missing character counter 31 in a permanently reset condition which precludes the introduction of information therein. The first symbol immediately following the pre-coded field serves to de-energize reset circuit 58, thereby placing the device in condition for recognition and storage of intelligence from the first group of characters in the post-coded field. Subsequently, the symbols 10 positioned after each group of characters in the post-coded field serve to reset the character counter 24, etc. and place them in condition for information to be derived from the next following group of post-coded characters.

The pulse from reset circuit 58 clears character counter 24, register 50 and missing digit counter 31 simply by placing each of the binaries in the "off" condition.

Missing character counter 31, as stated above, serves to ensure that one and only one missing character will be identified by the code analyzer of FIG. 1. Assume the situation in which obliterated character "2" is scanned by character reader 11. In the manner described above, missing character detector 25 produces an output pulse as shown in FIG. 4C. As shown in FIG. 1, the output of missing character detector 25 is transmitted to missing character counter 31 by lead 78.

The positive-going square wave pulse produced by missing character detector 25 is introduced into missing character counter 31 as shown in detail in FIG. 5. This pulse places symmetrically triggered flip-flop 67 into the "on" condition. When in the "on" condition, flip-flop 67 produces a continuous output signal at lead 68 which is transmitted to AND gate 56, as shown in FIG. 1. This is one of three signals which must be simultaneously received by AND gate 56 before it can transmit a signal to gated decode 55.

If at least two consecutive characters in a group are obliterated, missing character detector 25 will produce an extended positive going square wave pulse as shown in FIG. 4K. Flip-flop 67 will respond to such a pulse in exactly the same manner as if the pulse were one which was produced as a result of a single missing character. For this reason, an additional circuit is provided in missing character counter 31, since, as stated above, one of the functions of missing character counter 31 is to preclude any document analysis, which results in two or more missing characters being identified.

Thus, if two or more consecutive characters are obliterated, a pulse will be produced by consecutive missing character detector 26, as shown in FIG. 4H. The pulse produced by consecutive missing character detector 26, is transmitted to OR gate 69 by lead 79, as shown in FIG. 5. This pulse is transmitted by OR gate 69 to flip-flop 70 which is thereupon placed in the "on" condition. Output lead 71 is connected to flip-flop 70 so that it will transmit a signal only when flip-flop 70 is in the "off" condition. Accordingly, transmission of a pulse from consecutive missing character detector 26 to missing character counter 31 removes the signal from output lead 71 since such a pulse places flip-flop 70 into the "on" condition.

Flip-flop 70 is connected to be responsive to unsymmetrical triggering. Thus, subsequent pulses transmitted to flip-flop 70 through OR gate 69 will not result in a change of condition. In other words, once flip-flop 70 is placed in the "on" condition by a pulse from OR gate 69, it remains in this condition until reset.

AND gate 56 must transmit a pulse to gated decode 55 in order to produce an output from the device of FIG. 1. The absence of a signal at lead 71 prevents AND gate 56 from producing such a signal. Thus, missing character counter 31 precludes the production of an output from the device of FIG. 1 if two or more consecutive characters are obliterated.

It is not necessary for two missing character identifications to occur consecutively. In other words, the analyzer of FIG. 1 could properly detect that character "2" was obliterated, and then may erroneously determine that character "5," for example, is also missing. In such a situation, consecutive missing character detector 26 would not produce an output pulse. However, missing character counter 31 is designed for this eventuality.

The first pulse from missing character detector 25 places flip-flop 67 into the "on" condition, whereby a signal appears at output lead 68. Flip-flop 67 is connected to be responsive to symmetrical triggering, that is to say, its condition will be changed by each input pulse which is received through lead 78. Thus, the next pulse which is received from missing character counter 25 as a result of identification of a second missing character will place flip-flop 67 into the "off" condition. In response to passing from the "on" condition to the "off" condition, an output signal is produced.

This output pulse is transmitted by OR gate 69 to flip-flop 70. Flip-flop 70 responds in a manner identical to that described above where a pulse was transmitted through OR gate 69 from consecutive missing character detector 26. Thus, there will be no output if two non-consecutive missing characters are identified.

What has been described above in conjunction with FIG. 1 is a code analyzer suitable for analyzing a document containing both pre-coded and post-coded information. In addition to positive operation with respect to the characters which have been intentionally defaced or obliterated in the post-coded groups of characters, various safety features have been included in the logic circuit to prevent erroneous identification resulting either through inadvertent coding procedures, or from improper printing or other factors which prevent character reader 11 from recognizing a character.

The compatible code analyzer depicted in FIG. 1, represents one embodiment of the present invention. It is not unique in the sense that it is the only circuit suitable for accomplishing the desired result. Thus, for example, FIG. 7 depicts a second compatible code analyzer suitable for detecting missing characters in a post-coded document.

Shown in FIG. 7 is character reader 82 which may be of the same type as that disclosed in conjunction with FIG. 1. As shown in FIG. 7, separate output leads are employed for each of the characters recognized by character reader 82. Thus, recognition of character "0" produces an output pulse at output lead 83, recognition of character "1" produces an output pulse at output lead 84, etc.

The font of characters used with the embodiment of FIG. 1 differs from that used with the embodiment of FIG. 7. In FIG. 1, a majority of the characters produced the identical wave form when scanned. On the other hand, the characters used with FIG. 7 produce different wave forms, the differences being relied upon by the character reader as a basis of distinguishing between characters.

The output lead 93 of character reader 82 is the multiple read output lead. As discussed in the aforementioned Eckert application, a pulse appears at output lead 93 if character reader 82 produces two or more recognitions from a single scanned character.

Output lead 94 is the character presence lead, which as described in the aforementioned Eckert application, denotes that character reader 82 has made at least one recognition for a single scanned character.

Output lead 95 is employed to yield a pulse when symbol 10 is recognized.

Output lead 96 is the document presence lead, and a signal is present on this lead when a document is in the vicinity of the read head of character reader 82.

The compatible code analyzer of FIG. 7 is capable of detecting a character which has been obliterated in that its wave form is so distorted or eliminated entirely so that it cannot be recognized; the analyzer of FIG. 7 is also capable of detecting when an obliterated character is misrecognized as a different one of the characters of the group; and the analyzer of FIG. 7 is also capable of detecting when an obliterated character is misrecognized as two characters, one of which may be the character intended to be obliterated.

The operation of the circuitry of FIG. 7 will be explained assuming that the character "2" of the post-coded field as shown in FIG. 2 has been obliterated. The operation of reset circuit 97 of FIG. 7 is identical to that of reset circuit 58 in FIG. 1.

As shown in FIG. 7, document presence lead 96 and symbol 10, recognition lead 95 are connected to reset circuit 97. In turn, reset circuit 97 is connected to sequence generator 98, register 99 and missing character counter 100. The reset pulse produced by reset circuit 97 serves to clear and reset the aforementioned three circuit elements.

The recognition of character "0" by character reader 82 results in a pulse at output lead 83. Output leads 83 through 92 of character reader 82 are connected to encoder 101 which converts the characters from decimal to a binary form in which the binary notation is one count higher than its decimal equivalent. This is so that the binary combination 0000 (no character read) is not the same as the reading of character "0." Encoder 101 thus performs the reverse operation of gated decode 55 of FIG. 1. Accordingly, the recognition of character "0" results in a continuous signal at output lead 102 of encoder 101 (decimal "0"=binary 0001).

Output leads 102 through 105 of encoder 101 are connected to comparator 106.

The recognition of character "0" by character reader 82 also results in the presence of a pulse at output lead 94, the character presence lead. This pulse is transmitted to OR gate 107 by lead 108. In response to the character presence pulse, OR gate 107 transmits a signal to sequence generator 98 via lead 109.

Sequence generator 98 is a counter. In the embodiment shown in FIG. 7, sequence generator 98 is a binary counter similar to character counter 24 of the embodiment shown in FIG. 1. Accordingly, each character presence pulse transmitted by OR gate 107 is counted by sequence generator 98, the number of such pulses which are counted being manifested by appropriate combinations of signals at the first set of output leads 110 through 113 and also at second set of output leads 114 through 117 of sequence generator 98. Accordingly, recognition of the character "0" results in a continuous signal appearing both at output lead 110 and also at output lead 114.

Comparator 106 typically consists of a series of four AND gates, and compares for a mismatch between output leads 102 through 105 and the corresponding one of output leads 110 through 113. Comparator 106 produces an output signal at output lead 118 as a result of detecting one mismatch between any of the four pairs of leads compared.

Thus, in the illustration under discussion, recognition of character 0 results in a signal at output lead 102 of encoder 101. The character presence signal produced by character reader 82 also results in a signal at output leads 110 and 114 of sequence generator 98.

Comparator 106 compares the condition of output lead 102 with output lead 110, the condition of output lead 103 with the condition of output lead 111, etc. Upon comparing output lead 102 with output lead 110 comparator 106 finds a signal present at both leads. Since there are no signals present on output leads 103 through 105 or output leads 111 through 113, there is no mismatch to be found between these pairs. Accordingly, comparator 106 does not produce an output signal since there is no mismatch between corresponding pairs of leads.

Delay circuit 124 serves to delay the signal from OR gate 107 before transmitting it to AND gate 123. This is done to give comparator 106 additional time within which to determine whether a match or a mismatch exists. Because of the nature of sequence generator 98, it produces transients until it completes its shift to the new count. Accordingly, comparator 106 is given a short period of time for these transients to die down before making a comparison. The delay of the signal from OR gate 107 for a short period of time assures the accuracy of operation of AND gate 123 in that it will produce an output signal only if an actual mismatch exists as detected by comparator 106.

The same operation results from recognition of character "1."

Obliterated character "2" is now scanned by character reader 82. For the purposes of this illustration, it is assumed that character "2" has been completely obliterated so that there is a total absence of wave form. Accordingly, no character presence signal is produced at output lead 94, and no recognition output signal is produced at lead 85.

Missing character detector 119, consecutive missing character detector 120 and missing character counter 121 are employed as shown in the embodiment of FIG. 7. These three circuits perform the same functions as in the embodiment shown in FIG. 1. Accordingly, missing character detector 119 produces an output signal at lead 121 in response to the absence of a recognition signal for character "2." This signal is transmitted by OR gate 107 to sequence generator 98. Sequence generator counts this signal in the same manner as if it were a recognition signal. Thus, sequence generator 98 counts in response to recognition of a character and also in response to the absence of a recognition signal.

Since there was no recognition of character "2" by character reader 82, no signal appears at output lead 85. Accordingly, encoder 101 produces no signals at any of its output leads 102 through 105. On the other hand, sequence generator 98 has pulses at output leads 110 and 111, signifying that three counts have been made. In these circumstances, comparator 106 detects a mismatch in that there are no pulses at output leads 102 and 103 to match the signals appearing at output leads leads 110 and 111. Accordingly, comparator 106 produces an output signal at lead 118.

The mismatch signal thus produced by comparator 106 is introduced into OR gate 122. OR gate 122 thereupon transmits a signal to AND gate 123 via lead 126.

As shown in FIG. 7, the output lead 121 of missing character detector 119 is connected to OR gate 107. OR gate 107 is connected to delay circuit 124 by lead 125. Delay circuit 124 is, for example, a one-shot multivibrator or a delay line, and serves to delay the signal from missing character detector 119 for a short period of time before transmitting it to AND gate 123 via lead 127.

AND gate 123 produces an output signal only in response to concurrent signals from "OR" gate 122 and delay circuit 124. Both of these conditions are met by the complete obliteration of character "2." Thus, AND gate 123 produces an output pulse at output lead 128.

Gate 129, register 99 and gated decode 130 operate in a manner identical to their counterparts in the embodiment of FIG. 1 except that gated decode 130 must convert the binary to decimal making allowance for the fact that the binary is one count greater, as discussed above.

As stated above, sequence generator 98 produces a count for each character recognition signal and also for the absence of a recognition signal. At the point in time following scanning of obliterated character "2," sequence generator has counted three. This results in signals appearing at output leads 110 and 111, and also at output leads 114 and 115. When gate 129 is pulsed by AND gate 123, the intelligence present in the form of signals at leads 114 and 115 is transmitted to register 99.

As in the embodiment of FIG. 1, recognition of the symbol 10 which follows the first group of characters in the post-coded field results in an output by gated decode 130 only if one and only one missing character has been identified. To assure this result, missing character counter 100 is connected to AND gate 131 via lead 132A and 132B. Also connected to AND gate 131 is lead 133 which is connected to symbol 10 recognition output lead 95.

If missing character counter 100 has counted one and only one missing character, output pulses are produced at leads 132A and 132B. These output signals "and" with the symbol 10 recognition signal thereby resulting in an output signal from AND gate 131. This output signal is fed to gated decode 130. Accordingly, gated decode 130 produces a signal at the appropriate output lead thereby identifying the obliterated character.

Assume now the situation in which character "2" is obliterated, but instead of producing a complete absence of wave form, it is misrecognized by character reader 82 as character "6," for example. Sequence generator 98 will have output signals at leads 110 and 111 due to the character presence signal resulting from the erroneous recognition of obliterated character "2."

The erroneous recognition of character "2" as "6" will also result in a signal at output lead 89 of character reader 82. Encoder 101 converts this to excess 1 binary form and thereby produces signals at output leads 102, 103 and 104. Comparator 106 detects a mismatch in that the signal appearing at output lead 104 is not matched by a corresponding signal at output lead 112. Accordingly, comparator 106 produces an output signal.

Since character reader 82 produces an output signal, although erroneous, for obliterated character "2," missing character detector 119 does not produce an output pulse. However, the erroneous recognition of character "6" does produce a character presence signal at output lead 94. Since either a character presence signal or an output signal from missing character detector 119 can result in an output pulse from OR gate 107, an erroneous recognition has the same effect, in this respect, as detection of a missing character.

The signal from OR gate 107 is transmitted to delay circuit 124 and the operation from this point on is the same as described above.

The third situation which may result from obliteration of character "2" is that character reader 82 misrecognizes an obliterated character as two characters. One of the two misrecognized characters may be the character obliterated, in this instance, character "2."

If the two characters are recognized from one scan, character reader 82 produces a multiple read signal at output lead 93. This signal is transmitted by OR gate 122 in the same manner as a mismatch signal from comparator 106. Thus, the misrecognition of two characters by character reader 82 has the same effect as a completely obliterated character even if one of the two misrecognized characters is the one which was intended to be obliterated.

Thus, missing character counter 100 is affected by a multiple read signal, by a misrecognized character, or by a completely obliterated character. As stated above, missing character counter 100 performs the function of assuring that one and only one character is identified as being obliterated. Should any combination of two or more of the foregoing situations occur, missing character counter 100 would be precluded from producing a pulse at output leads 132A and 132B and, accordingly, gated decode 130 would not produce an output signal.

The two embodiments shown in FIGS. 1 and 7 are based on the sequence in which the characters appear in the post-coded groups. The code analyzer depicted in FIG. 8 operates independently of the sequence of the characters, being affected only by the presence or absence of a particular character.

FIG. 8 depicts character reader 134 which is conveniently of any of the types described herein. Output lead 135 is for character "0," output lead 136 is for character "1," etc. Recognition of symbol 10 produces an output signal at lead 139. Channels are also provided for characters 3 through 8, these not being shown in the interest of simplicity of exposition.

Each of the output leads 135 through 139 is connected to a separate flip-flop circuit. Thus, for example, output lead 135 is connected to flip-flop 140, output lead 136 is connected to flip-flop 141, etc. Each of the flip-flop circuits is arranged for unsymmetrical triggering.

The symbol 10 which follows the pre-coded field produces a signal at output lead 139. This output signal is differentiated by capacitor 144 and the resultant pulse which occurs at the end of the signal resets each of flip-flops 140 through 143 to the "on" condition. When in the "on" condition, a signal appears at output leads 152 through 155.

As each character is recognized by character reader 134, the pulse produced at the appropriate output lead is transmitted to the respective flip-flop and thereby places the flip-flop in the "off" condition. When in the "off" condition, no signal appears at the output of the flip-flop.

After an entire group of characters in the post-coded field has been scanned, symbol 10 following such group produces an output signal at lead 139. The signal thus produced is transmitted to INHIBITOR gate 145. INHIBITOR gate 145 produces an output signal if a symbol recognition signal is present on lead 139 concurrent with the absence of a signal from multiple read circuit 151.

In the normal situation, all except one of the flip-flops will be in the "off" condition, the one in the "on" condition representing the character which has been obliterated. As shown in FIG. 8, the outputs of flip-flops 140 to 143 are summed by connection of resistors 146 through 149 to lead 150. Lead 150 is connected to multiple read circuit 151.

Multiple read circuit 151 is similar to that employed in the aforementioned Eckert application to detect multiple recognitions. If more than one flip-flop is in the "on" condition, the potential level of the summing network comprising resistors 146 through 149 exceeds the threshold level of multiple read circuit 151. In such instance, multiple read circuit 151 produces a multiple read pulse which prevents INHIBITOR gate 145 from producing an output signal.

Each one of output leads 152 through 155 is connected to a separate one of AND gates 156 through 159. If the conditions called for by INHIBITOR gate 145 are met, an output pulse is produced which is fed to each of AND gates 156 through 159.

Any one of AND gates 156 through 159 will produce an output pulse if concurrent signals are present at both of its input leads. Thus, for example, assuming that character "2" is obliterated, flip-flop 142 will remain in the "on" condition thereby producing a pulse at output lead 154. When the symbol 10 following the first group of characters in the post-coded field is recognized, an output signal will appear at output lead 139. This output signal is fed to INHIBITOR gate 154. If there is no multiple recognition, multiple read circuit 151 will not produce an output pulse. This will result in a signal being transmitted from INHIBITOR gate 145 to each of AND gates 156 through 159. Since AND gate 158 is the only one which also has a concurrent pulse being transmitted to it from its associated flip-flop, only AND gate 158 will produce an output signal. The presence of an output signal from AND gate 158 is representative of the fact that character "2" was obliterated.

Capacitor 144 is employed to differentiate the signal resulting from recognition of symbol 10 so that flip-flops 140 through 143 will be reset by the trailing edge of the recognition signal. This delays the resetting of the flip-flops into the "on" condition until the one flip-flop in the "on" condition as a result of obliteration of a character is identified by AND gates 156 through 159.

In addition to the three embodiments described above, additional code analyzing devices may be devised. FIG. 9 depicts a code analyzer employing a shift register for identifying which of the characters of a post-coded group is obliterated.

As shown in FIG. 9, the character reader 161 which is employed, has two output leads 162 and 163. Output lead 162 is connected to transmit a signal when the symbol 10 is recognized. Output lead 163 is connected to transmit signals when any of the characters "0" through "9" are recognized. In this particular embodiment, the characters may be all identified uniquely, as in the embodiment of FIG. 7, and a separate output lead for each character being subsequently connected to an OR gate, or in the alternative, the characters may be designed to have the same wave form so that only a single channel is needed, in accordance with the principle of operation of the embodiment of FIG. 1.

The shift register employed in the embodiment of FIG. 9 is made up of a series of elements 164 through 170, several of these elements and associated circuitry being omitted from the drawing in the interest of clarity of exposition. (For details on shift registers, see Pulse and Digital Circuits, Millman & Taub, McGraw-Hill Book Publishing Company, 1956, pages 412 and 413.)

Assume that the character "0" is recognized by character reader 161. A pulse is transmitted through output lead 163 to OR gate 171 via lead 172. This pulse is also transmitted to register element 164 causing it to go into the "1" condition.

OR gate 171 transmits the recognition pulse to delay circuit 173 which delays the pulse for a short period of time slightly greater than the duration of a recognition pulse and then transmits it to shift generator 174. By the time shift generator 174 receives the delayed signal from delay circuit 173, register element 164 has been acted upon by the recognition pulse. Shift generator 174 then pulses element 164 thereby transferring the condition of element 164 to the element 165.

After the recognition of character "1" by character reader 161, the above procedure is repeated. Accordingly, element 166 will be in the "1" condition due to the condition of element 165 being transmitted thereto. Element 165 will also be in the "1" condition due to the action of recognition pulse on element 164.

Assuming that character "2" has been obliterated there is no recognition pulse produced by character reader 161. However, missing character detector 175 is actuated by the absence of a recognition pulse. As in the other embodiments, missing character detector 175 produces an output signal if the time order sequence of recognition signals from character reader 161 is interrupted.

The output signal of missing character detector 175 is introduced into OR gate 171, and from this point on, the operation of delay circuit 173 and shift generator 174 is the same as if a recognition pulse has been produced. However, since no character was recognized, register element 164 will not be placed in the "1" condition, but will remain in the "0" condition as a result of being pulsed by shift generator 174. Accordingly, the transfer of the condition of element 164 to element 165 will result in element 165 being in the "0" condition.

Thus, the presence or absence of recognition pulses is indicated by the sequential condition of the elements 165 through 170 of the shift register. When the last character in the group has been recognized, in this instance, character "9," each of elements 165 through 170 will be in either the "0" or the "1" condition, depending upon whether or not the character represented by the particular element was or was not obliterated.

The inverted or "0" side of each shift register elements 165 through 170 is connected to multiple read circuit 183 and also connected to AND gates 177 through 182 in the manner described above in conjunction with FIG. 8. Multiple read circuit 183 performs the same function as its counterpart in FIG. 8. Accordingly, an output pulse will be produced by one of AND gates 177 through 182, depending upon which one of the characters of the group has been obliterated.

The reset circuit of the embodiment of FIG. 1 may be employed if the code analyzer is to be employed in conjunction with the reading of pre-coded characters.

Figure 10:
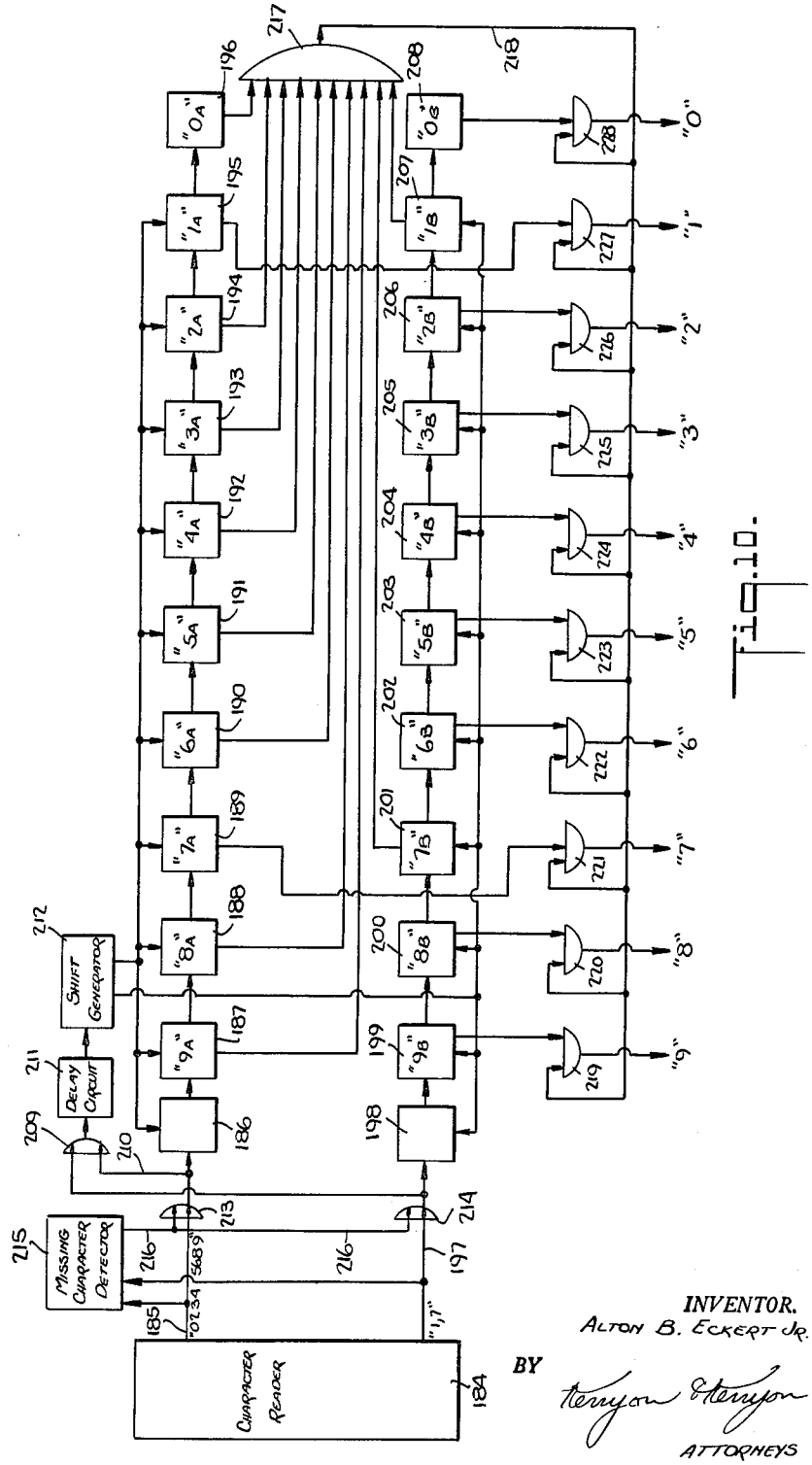
FIG. 10 is a schematic drawing of a fifth device in accordance with this invention suitable for use in reading pre-coded and post-coded characters.

Another embodiment of the present invention is depicted in FIG. 10. This embodiment also employs the principle of the shift register. As shown in FIG. 10, character reader 184 has two output leads. Lead 185 carries recognition pulses from characters "0", "2", "3", "4", "5", "6", "8" and "9" and transmits them to a first shift register composed of elements 186 to 196. Lead 197 carries recognition pulse for characters "1" and "7" and transmits these pulses to a second shift register composed of elements 198 to 208. As will be described below, this particular division of characters is not critical, any division which produces a logical result being suitable.

The embodiment shown in FIG. 10 is different than the others in that symbols are not required between groups of characters in the post-coded field. The discussion above in conjunction with FIG. 9 as to the use of reset circuits applies equally well to FIG. 10.

Assume the situation in which post-coded character "0" is recognized by character reader 184. A pulse is produced at output lead 185. This pulse is transmitted to OR gate 213 which in turn causes register element 186 to go into the "1" condition. The pulse from the recognition of character "0" is transmitted by OR gate 213 via lead 210 to delay circuit 211 and shift generator 212 which operate in the manner described above in conjunction with FIG. 9. Accordingly, recognition of character "0" causes register element 187 to go into the "1" condition.

Recognition of the character "0" produces no pulse in output lead 197. Accordingly, register element 198 is not converted to the "1" condition. Shift generator 212 when actuated by recognition of character "0" transfers the condition of element 198 to element 199. Thus, following the recognition of character "0," element 187 is in the "1" condition and element 199 is in the "0" condition.

Recognition of the charter "1" produces an output pulse in output lead 197. This pulse is introduced into OR gate 214 which in turn transmits it to element 198. Accordingly, element 198 is placed in the "1" condition. Element 186 remains in the "0" condition. Operation of shift generator 212 as a result of the recognition of character "1" causes the intelligence in each of the elements of both sets of shift registers to be transferred to the next element. Accordingly, element 188 is placed in the "1" condition due to the transfer of intelligence from element 187. Element 187 is placed in the "0" condition due to the transfer of intelligence from element 186. In the other register, element 200 is placed in the "0" condition and element 199 is placed in the "1" condition.

Assume that character "2" has been obliterated. Accordingly, no pulse is produced either at output lead 185 or at output lead 197. However, missing character detector 215, which operates in the same manner as its counterpart in the above embodiments, produces an output pulse at lead 216, signifying the absence of a character. The pulse thus produced by missing character detector 215 is introduced into OR gate 213 and into OR gate 214. Accordingly, element 186 and element 198 are both placed in the "1" condition. Operation of the shift generator 212 transfers the information in all of the elements to the next succeeding element in the same register.

When the last character of a group is scanned by character reader 184 and the appropriate intelligence introduced into elements 186 and 198, and subsequently shifted, the sequence pattern of the elements in the two registers will be indicative of the particular character which was obliterated. It is noted in FIG. 10 that elements 187 through 196 are designated as $9_A$, $8_A$, etc., and that elements 199 through 208 are denoted as $9_B$, $8_B$, etc. This is to indicate that the two elements designated $9_A$ and $9_B$, for example, contain intelligence indicative of whether character "9" was recognized or obliterated. If character "9" was recognized, element 187 will be in the "1" condition and element 199 will be in the "0" condition. Alternatively, if character "9" was obliterated and, therefore, not recognized, both elements 187 and 199 will be in the "1" condition.

For purposes of illustration, assume that no one of the characters was obliterated. In such a situation, in the first register elements 187, 188, 190 through 194 and element 196 would all be in the "1" condition, since the recognition pulse produced for each of characters "0" and "2" through "9" was transmitted to this register. Likewise, in the second register elements 201 and 207 would be in the "1" condition indicating that both characters "1" and "7" produced recognition pulses. The outputs of elements 187, 188, 190 through 194 and element 196 of the first register, and elements 201 and 207 of the second register are connected to AND gate 217. Thus, after the last character of the group has been recognized, output pulses will appear at each of the aforementioned output leads and AND gate 217 will produce an output signal at its output lead 218.

The output leads of each elements 189 and 195 in the first register, and elements 199, 200, 202 through 206, and 208 in the second register, are respectively connected to AND gates 219 through 228 as shown in FIG. 10. In other words, the elements whose outputs are connected to AND gates 219 through 228 are those elements which are not connected to AND gate 217. The elements are connected to AND gates 219 and 228 in such fashion that no signal appears if the element is in the "0" condition.

It is to be recalled that all of the elements connected to AND gate 217 are those which would be in the "1" condition regardless of whether the characters associated with the particular register are present or obliterated. This is because the recognition of a character results in a "1" condition in the first element of the appropriate register, whereas the absence of a character results in a "1" condition in the first element of both registers. It follows, therefore, that the elements connected to AND gates 219 through 228 will be in the "0" condition unless a character is obliterated, in which latter instance the particular element associated with the obliterated character would be in the "1" condition.

Each of AND gates 219 through 228 requires a pair of input signals, one of which is to be supplied by AND gate 217 and the other of which is to be supplied by the register element, in order to produce an output pulse. Referring to AND gate 219, for example, in order for an output pulse to be produced, a pulse is required both from AND gate 217 and from element 199.

Accordingly, if the character "9" produces a recognition pulse, this pulse is introduced into element 187, and not into element 199. Therefore, element 199 will be in the "0" condition and no output pulse will be produced by AND gate 219 upon receiving a signal from AND gate 217.

Referring now to the situation in which character "9" has been obliterated, this results in both elements 186 and 198 being placed in the "1" condition as a result of a pulse from missing character detector. This information is shifted along to the next element in both shift registers so that elements 187 and 199 reflect this information. In other words, after the last character in the post-coded group is scanned, elements 187 and 199 will be in the "1" condition.

All of the other elements will be in the condition described above in the situation in which all of the other characters are present and recognized. Accordingly, all of the conditions called for by AND gate 217 will be fulfilled. Therefore, AND gate 217 will produce an output signal which is transmitted to each of AND gates 219 through 228. The only element connected to one of AND gates 219 through 228 and which is in the "1" condition is element 199. Accordingly, an output signal will be produced by AND gate 219.

As stated above, the embodiment shown in FIG. 10 does not require the use of a symbol. This is because the circuitry is such that AND gate 217 is continually examining the permutation of all of the elements in both registers. However, a pulse will not be produced by AND gate 217 until an entire group of characters has been scanned by character register 184. It is for this reason that care must be taken in the division between the two output channels of character reader 184 to assure that AND gate 217 will not be able to produce an output signal as a result of a unique condition of present and absent characters.

Once all of the characters in a group have been scanned, the condition of the elements in the two shift registers will form the proper pattern thereby enabling AND gate 217 to produce an output pulse. The output pulse thus produced will be fed to AND gates 219 through 228 to determine which of the elements associated therewith is in the "1" condition due to the obliteration of a character. An output pulse will then be produced by the appropriate one of AND gates 219 through 228.

In all of the embodiments described above, the characters which were representative of the intelligence on the document also served as a basis for the scanning step in which the intelligence was extracted. However, it is possible to provide a code system in which an abstract configuration corresponding to each of the intelligence-bearing characters is employed. A document so coded is depicted in FIG. 11.

Figure 11:
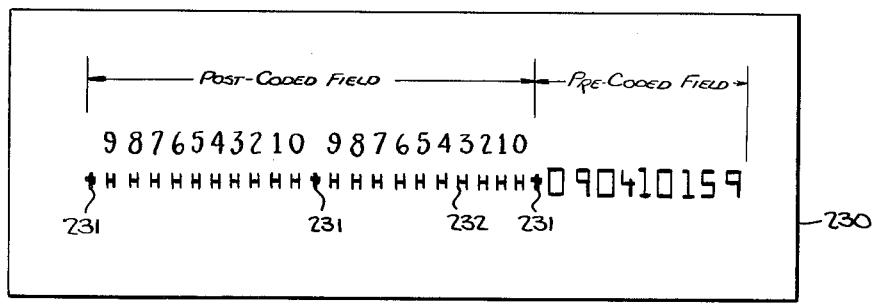
FIG. 11 is a schematic drawing of a document coded in accordance with another embodiment of this invention.

FIG. 11 depicts a document 230 containing a pre-coded field and a post-coded field. In the post-coded field a symbol 231 is employed as in the code system depicted in FIG. 2. Below each of the characters of the post-coded field in FIG. 11 there is printed an abstract configuration 232.

In using such a code system, instead of obliterating the character representative of the intelligence to be imparted to the document, the corresponding abstract configuration 232 is obliterated. The scanning operation proceeds on the series of abstract configurations 232 and symbols 231. The circuitry employed for code analysis may be any of the systems described above in which the scanned characters can all produce the same wave form when scanned.

As shown in FIG. 11, abstract configurations 232 have a moderately complicated shape. This is due to the desire to provide a configuration which, when scanned, yields a distinctive wave form. A distinctive wave form is one which is different from any wave form likely to be produced inadvertently, for example, by a misprint of magnetically active ink, and which lends itself to the complex type of wave form analysis utilized in the type of character reader described in the aforementioned Eckert application.

Of course, it is to be appreciated that instead of a configuration which produces a distinctive wave form, other shapes such as single lines or dots may be employed. However, these shapes will not be as advantageous from the standpoint of accuracy as those which produce distinctive wave forms.

The character fonts suitable for use with embodiments such as that shown in FIG. 7, which embodiment requires that each character of a post-coded group be recognized as different from every other character of the group are preferably designed so that each of the characters has a distinctive wave form, as that term is described above. Additionally, it is to be appreciated that each of the characters in the font must be mutually distinguishable by the character reader, in other words, must produce mutually distinguishable wave forms.

The disclosure of the code system shown in FIG. 11 necessitates defining certain terms so that there will be no indefiniteness in the specification or claims relating to this aspect of the invention. The term "character" is used in the specification and claims to denote a shape or configuration which is scanned by the character reader of the device disclosed. That is to say, the term "character" includes both the magnetically active numbers as they are used in the document shown in FIG. 2, and also the magnetically active abstract configuration as they are employed in the document shown in FIG. 11.

All of the embodiments described above relate to a code system in which only one of the characters in a group of post-coded characters is obliterated. This means that if the post-coded group contains ten characters, the total number of possibilities with respect to the intelligence which may be imparted to the document is limited to ten. In other words, the number of different bits of information which may be imparted by obliterating one character in a group is exactly equal to the number of characters in the group.

In accordance with another aspect of this invention, a code system is provided which substantially increases the number of different bits of information which may be encoded. This code system is identical to that described above except that more than one character is obliterated from the post-coded field. In the illustrative example described below, two characters are obliterated from each group of characters in the post-coded field. However, it is to be appreciated that by proper modification of the code analyzer, three or more characters may be obliterated from each group of the post-coded field.

This aspect of the present invention is described in detail with reference to the embodiment shown in FIG. 8. However, it is to be appreciated that any of the other embodiments described may be similarly modified to permit the advantageous coding system to be used.

With reference to FIG. 8, there is depicted a code analyzer suitable for use in analyzing a group of post-coded characters in which one of the characters has been obliterated. As shown in FIG. 8, the character reader 134 is separately connected to flip-flops representing each of the characters in the group. In turn, each of the flip-flops is connected to a separate output AND gate. A multiple read circuit 151 operating through INHIBITOR gate 145 is employed to assure that at least one and no more than one character has been obliterated. When the conditions of INHIBITOR gate 145 are satisfied, a pulse is transmitted to each of the output AND gates. The AND gate which also receives a pulse from its associated flip-flop in turn produces an output signal representative of the character obliterated.

Figure 12:
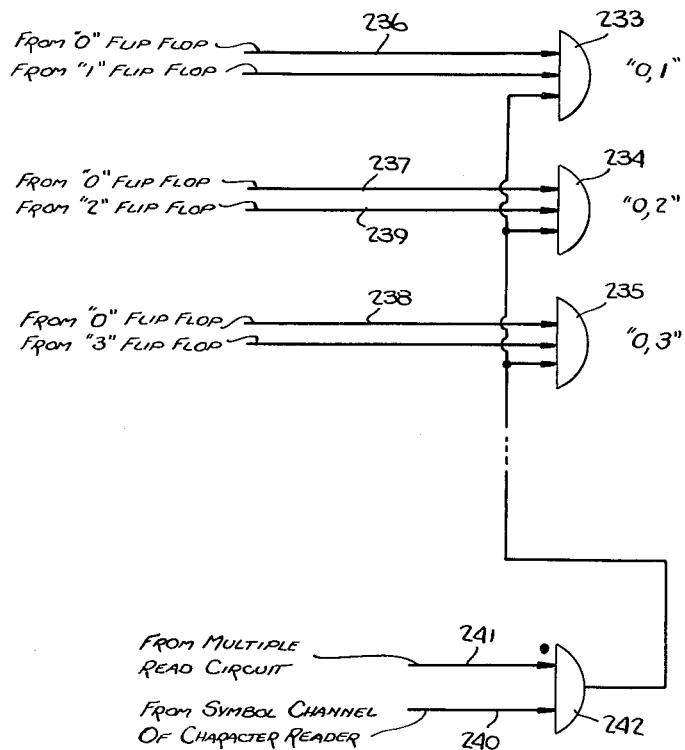
FIG. 12 is a modification of the embodiment of FIG. 8 suitable for use in a system in which two characters are obliterated from a group of post-coded characters.

FIG. 12 depicts the only portion of the device of FIG. 8 which must be modified in accordance with the coding system in which two or more characters in a group of the post-coded field are obliterated. With reference to FIG. 8, the modification involves only the output AND gates 156 through 159 and multiple read circuit 151.

Shown in FIG. 12, are output AND gates 233, 234 and 235, the balance of the output AND gates not being shown. AND gates 233 through 235 are intended to represent the group of forty-five AND gates which are used in this embodiment. Also shown is INHIBITOR gate 242 which performs the same function as INHIBITOR gate 145 in FIG. 8.

Assume that characters "0" and "2" are obliterated in the first group of the post-coded field. After the entire group of characters has been scanned, an output signal appears on leads 236, 237 and 238, in the manner described above in conjunction with FIG. 8, indicating that "0" was not recognized by the character reader. The signals appear at each of leads 236, 237 and 238 since, as shown in FIG. 12, these leads are connected to the "0" flip-flop (not shown).

In addition, a signal would appear on lead 239, which is connected to the "2" flip-flop (not shown) since character "2" was not recognized.

The symbol 231 appearing on the coded document after the group of post-coded characters results in a signal appearing at lead 240, lead 240 being connected to the symbol recognition channel of the character reader. Assuming that the conditions of the multiple read circuit (not shown) are satisfied, no signal appears at lead 241. Thus, the conditions of INHIBITOR gate 242 are satisfied and it, in turn, would produce a signal which is fed to each of AND gates 233, 234 and 235. Since AND gate 234 is the only one which as all of its conditions satisfied, it will be the only AND gate producing an output pulse. The output pulse is indicative of the fact that both character "0" and character "2" were obliterated.

A simple permutational analysis will indicate that there are 45 different pairs of characters in a group of ten characters. In other words, a coding system based on choosing two characters from a group of ten characters provides 45 different possibilities with respect to the numbers of bits of information which may be introduced into the coded document. This is almost a five-fold increase over the case when only one character is obliterated from a group of ten characters.

The multiple read circuit must be slightly modified so that it embodies two separate circuits, one of which will produce a signal if three or more characters are not recognized by the character reader, and the other to produce a signal if one or no characters are not recognized by the character reader. In other words, the multiple read circuit will produce a signal in the event that more than two or less than two missing characters are detected. This is necessary in order to assume that two and only two characters have been obliterated in the coding step. Such modification of the multiple read circuit is within the skill of the art and need not be described herein.

The term "obliteration" as used in the specification and claims is intended to mean either partial or total defacement such that scanning by the character reader does not result in an accurate recognition of the character obliterated. It is possible to partially obliterate or deface the character so that a recognition is made by the character reader, which recognition, however, is not that of the character obliterated. Some of the embodiments described above are designed for this possibility.

Described above are several embodiments which are suitable for use in scanning a document containing at least one group of post-coded characters to determine which of the characters has been obliterated. All of the embodiments include a character reader which produces a wave form as a result of scanning a character. The pulse produced by the character reader is then introduced into a logic circuit. In some of the embodiments, the sequence of recognition pulses is the foundation for determining the absence of a character. That is to say, when the sequence of pulses is broken, register or counting means are provided within the logic circuit to determine the precise point at which the sequence is broken, thereby identifying the absent character.

In another embodiment, the character reader uniquely recognizes the various characters of the post-coded group and transmits recognition pulses to a separate memory or logic circuit associated with each character of the group. Additional logic means are provided to analyze the memory or storage means in order to determine the identification of the absent character.

Lastly, embodiments have been described employing the well known principle of the shift register. In these embodiments, the recognitions of the post-coded characters are introduced into one or more shift registers. The shift registers are analyzed to determine the identity of the missing character.

Each of the embodiments described above is considered novel and unique in that it represents an entirely new method of identifying absent characters. In addition, the process or system upon which each of the embodiments is based is also considered novel in that it represents an entirely new field in the coding art.

I claim:

1. A code analyzer capable of identifying at least one obliterated character from among a group of characters printed on a document comprising reading means for scanning said group of characters and producing an output signal for each scanned character uniquely recognized and producing no output when an obliterated character is scanned, each of the characters in said group having a configuration which permits said unique recognition, whereby each output signal produced by said reading means is representative of a different one of the said group of characters, and logic means comprising memory elements and analyzing means, each of said memory elements being responsive to a different one of the output signals produced by said reading means, whereby the condition of each of the said memory elements reflects the presence or absence of a recognition signal from said reading means for each of the said characters, and said analyzer means being responsive to the respective conditions of each of the said memory elements and producing an output signal identifying the obliterated character.

2. A logic device for use with a character reader which is effective to produce an appropriate output for each successive non-obliterated character of a group of characters and which is effective to produce an appropriate output for any obliterated character of said group of characters, said logic device comprising means for recognizing the occurrence of each of said appropriate outputs and for recognizing the non-occurrence of any of said appropriate outputs, analyzing means operatively associated with said first-named means for identifying any obliterated character of said group of characters by the non-occurrence of the associated appropriate output and for identifying any non-obliterated character by the occurrence of the associated appropriate output, means operatively associated with said analyzing means for producing a distinctive output representative of any obliterated characters identified by the analyzing means, and means operatively associated with said analyzing means for preventing said distinctive output when other than a predetermined number of obliterated characters is identified by said analyzing means.

3. A code analyzer capable of identifying at least one obliterated character from among a group of characters printed in sequential order on a document comprising reading means which scans said group of characters in said sequential order and produces an identifying output signal for each scanned character which is recognized and produces no identifying output signal when an obliterated character is scanned, the said reading means thereby producing a sequence of output signals representative of the condition of said group of characters, and logic means comprising missing character detection means, counting means, comparator means, memory means and analyzing means, said missing character detection means being connected to said reading means and producing an output signal in response to the absence of an output signal from said reading means, said counting means being responsive both to said reading means and to said missing character detection means, whereby a count is made both when a character is recognized by said reading means and when a character is not recognized by said reading means, said comparator means being responsive both to said counting means and to said reading means and producing an output signal when a mismatch is detected between the outputs of said counting means and said reading means, said memory means being responsive to the output of said comparator to store information relating to the sequential position of the output signals of said comparator, and said analyzing means being connected to said memory means and producing an output signal identifying the obliterated character in response to the information stored in said memory means.

4. The code analyzer of claim 3, in which said document includes a reset symbol, said reading means producing a distinctive output signal in response to scanning of said reset symbol, and in which said code analyzer comprises reset means responsive to said distinctive symbol for clearing said logic means.

5. A code analyzer which is capable of identifying a predetermined number of obliterated characters from among a group of characters comprising reading means which scans said group of characters and produces an identifying signal for each scanned character which is recognized, said reading means producing no identifying signal when an obliterated character is scanned, missing character detection means responsive to the number of characters scanned by said reading means for which no output is produced, and logic means comprising memory means and analyzing means, said memory means being responsive to the output of said reading means, the condition of said memory means reflecting the presence and absence of identifying output signals from said reading means, the said analyzing means being responsive to the condition of said memory means for producing an output identifying the obliterated characters, said missing character detection means being operatively associated with said analyzing means for preventing said output thereof when the number of scanned characters for which said reading means produces no output exceeds the said predetermined number of obliterated characters.

6. A code analyzer capable of decoding a document which is coded by obliterating a predetermined number of characters from among a group of characters present on the precoded document comprising a reading means which scans said group of characters and produces an identifying output for each scanned character which is recognized, said reading means producing no identifying output signal when an obliterated character is scanned, missing character detection means responsive to the number of characters scanned by said reading means for which no output is produced, and logic means responsive to the output from said reading means whereby the obliterated characters are identified by reason of the failure of said reading means to produce an identifying output signal therefrom, and means responsive to said logic means for producing a distinctive output representative of the obliterated characters identified by said logic means, said missing character detection means being operatively associated with said last-named means for preventing said distinctive output when the number of scanned characters for which said reading means produces no output exceeds the said predetermined number of obliterated characters.

7. The code analyzer of claim 6, in which each of said group of characters on the pre-coded document is magnetically active and said reading means is responsive to the magnetic activity of the characters.

8. A code analyzer capable of identifying a predetermined number of obliterated characters from among a group of characters printed in sequential order on a document comprising reading means which scans said group of characters in said sequential order and produces an identifying output signal for each scanned character which is recognized and produces no identifying output signal when an obliterated character is scanned, the said reading means thereby producing a sequence of output signals representative of the condition of said group of characters, logic means comprising shift register means and analyzer means, said shift register means being responsive to the said sequence of output signals from said reading means whereby the condition of said shift register means is representative of the condition of said group of characters, and said analyzer means being connected to said shift register means for producing an output in response to the condition of said shift register means to identify the obliterated characters, and means operatively associated with said analyzer means for preventing the output thereof when the number of obliterated characters identified by said analyzer means exceeds the said predetermined number of obliterated characters.

9. A code analyzer capable of identifying a predetermined number of obliterated characters from among a group of characters printed in sequential order on a document comprising reading means which scans said group of characters in said sequential order and produces an output signal for each scanned character which is recognized and produces no output signal when an obliterated character is scanned, the said reading means thereby producing a sequence of output signals representative of the condition of said group of characters, missing character detection means responsive to the number of characters scanned by said reading means for which no output signal is produced, and logic means comprising counting means, memory means, and analyzing means, said counting means being responsive to the sequence of output signals produced by said reading means and producing a count for each signal received and producing no count when an output signal is omitted from the said sequence of output signals, said memory means being responsive to said counting means to store information relating to the sequential position of the absent output signal from said reading means which results when an obliterated character is scanned, and said analyzer means being connected to said memory means for producing an output signal identifying the obliterated characters in response to the information stored in said memory means, said missing character detection means being operatively associated with said analyzer means for preventing said output thereof when the number of characters scanned by said reading means for which no output signal is produced is other than the said predetermined number of obliterated characters.

10. The code analyzer of claim 9 in which said document includes a reset symbol, said reading means producing a distinctive output signal in response to scanning of said reset symbol and in which said code analyzer comprises reset means responsive to said distinctive symbol for clearing said logic means and said missing character detection means.

11. The code analyzer of claim 9 in which said predetermined number of characters is one and in which said missing character detection means comprises a consecutive missing character detector which is actuated when said reading means scans at least two consecutive characters for which no signal is produced.

12. The code analyzer of claim 9 in which there are $n$ characters in said group and in which $(n-1)$ characters of said group are commonly recognizable when scanned by said reading means.

13. A code analyzer capable of decoding a document which is coded by obliterating a predetermined number of characters from among a group of characters present on the precoded document comprising a reading means which scans said group of characters and produces an identifying output for each scanned character which is recognized, said reading means producing no identifying output signal when an obliterated character is scanned, missing character detection means for detecting the number of obliterated characters identified by said logic means, and logic means responsive to the output from said reading means whereby the obliterated characters are identified by reason of the failure of said reading means to produce an identifying output signal therefrom, and means responsive to said logic means for producing a distinctive output representative of the obliterated characters identified by said logic means, said missing character detection means being operatively associated with said last-named means for preventing said distinctive output when the number of obliterated characters identified by said logic means exceeds the predetermined number of obliterated characters.

14. A code analyzer capable of identifying a predetermined number of obliterated characters from among a group of characters printed on a document comprising reading means for scanning said group of characters and producing an output signal for each scanned symbol uniquely recognized and producing no output when an obliterated character is scanned, each of the characters in said group having a configuration which permits said unique recognition, whereby each output signal produced by said reading means is representative of a different one of the said group of characters, and logic means comprising memory elements and analyzing means, each of said memory elements being responsive to a different one of the output signals produced by said reading means, whereby the condition of each of the said memory elements reflects the presence or absence of a recognition signal from said reading means for each of the said characters, and said analyzer means being responsive to the respective conditions of each of the said memory elements for producing an output signal identifying the obliterated characters, and means operatively associated with said analyzer means for preventing the output signal thereof when the number of obliterated characters identified by said analyzer means exceeds the said predetermined number of obliterated characters.

15. A code analyzer capable of identifying a predetermined number of obliterated characters from among a group of characters printed in sequential order on a document comprising reading means which scans said group of characters in said sequential order and produces an identifying output signal for each scanned character uniquely recognized and produces no output signal when an obliterated character is scanned, the said reading means thereby producing a sequence of output signals representative of the condition of said group of characters, and logic means comprising a plurality of shift register means and analyzer means, the characters of said group being divided into sub-groups the number of which is equal to the number of shift register means, each of said shift register means being responsive to the output signals produced by said reading means for the scanned characters of a respective sub-group, whereby the cumulative condition of the said plurality of said shift register means is representative of the condition of said group of characters, and said analyzer means being connected to the plurality of said shift register means for producing an output in response to the condition of said shift register means to identify the obliterated characters.

16. A coding-decoding method comprising providing a document having a precoded field of characters and a post-coded field of characters printed thereon, said fields being separated by a reset symbol, said precoded field comprising a selected number of visibly distinguishable characters in a preferred sequence and the post-coded field comprising a group of visibly distinguishable characters in an ordered sequence, post-coding said document by obliterating a predetermined number of characters in the post-coded field, introducing said document into a code analyzer responsive to the characters in the precoded field, to the characters in the post-coded field and to the symbol, and deriving intelligence from said code analyzer which is representative of said pre-coded field and of said post-coded field.

17. The method of claim 16, in which there are $n$ characters in said post-coded field and $(n-1)$ of said characters are commonly recognized by said code analyzer.

18. The method of claim 16, in which the characters in said post-coded field are obliterated by removing substantially all of the portions of the document on which the characters to be obliterated are printed.

References Cited by the Examiner

UNITED STATES PATENTS

| 2,206,206 | 7/40 | Smith | 235—61.12 |
| 2,706,215 | 4/55 | Van Duuren | 178—23.1 |
| 2,942,242 | 6/60 | Sharp | 340—172.5 |
| 2,975,407 | 3/61 | O'Brien | 340—174.1 |
| 3,005,189 | 10/61 | O'Brien | 340—174.1 |
| 3,083,903 | 4/63 | Larson | 340—172.5 |
| 3,100,834 | 8/63 | Demer | 235—61.12 |

MALCOLM A. MORRISON, *Primary Examiner.*

NEIL C. READ, *Examiner.*